Jan. 8, 1957
A. KEEL
2,776,629
POWER TRANSMISSION
Filed July 10, 1952
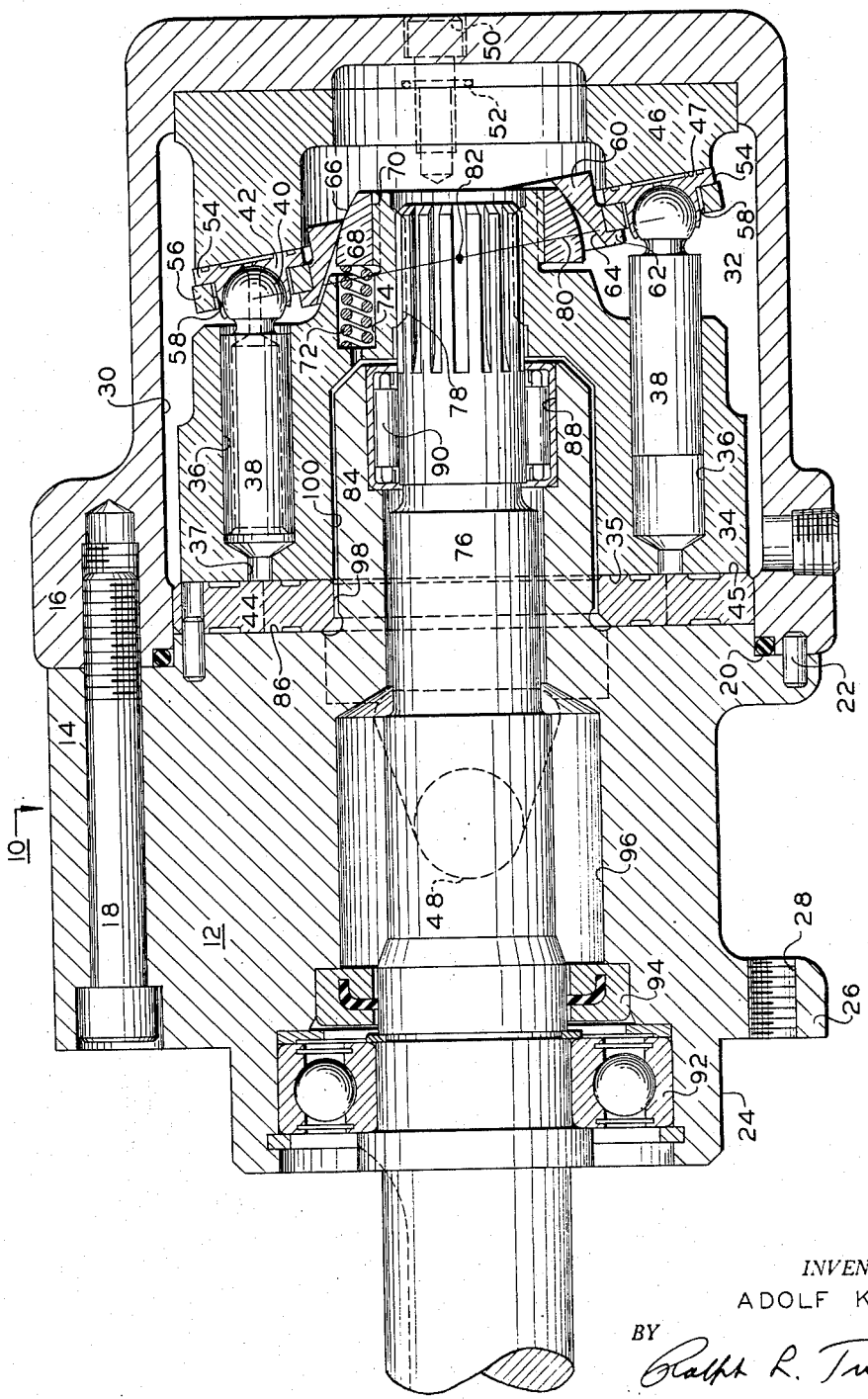
INVENTOR.
ADOLF KEEL
BY
*Ralph R. Truesdale*
ATTORNEY

United States Patent Office 2,776,629
Patented Jan. 8, 1957

2,776,629
POWER TRANSMISSION

Adolf Keel, Highland Park, Mich., assignor to Vickers Incorporated, Detroit, Mich., a corporation of Michigan Application July 10, 1952, Serial No. 298,077

1 Claim. (Cl. 103—162)

This invention relates to power transmissions, and is particularly applicable to those of the type comprising two or more fluid pressure energy translating devices, one of which may function as a pump and another as a fluid motor.

The invention is more particularly concerned with a fluid pump or motor construction of the type having a rotary cylinder barrel abutting a stationary valve plate, and provided with axial cylinders and pistons reciprocable therein which abut against a thrust plate, the axis of which is inclined to the axis of rotation of the cylinder barrel. It is particularly concerned with that class of devices wherein the pistons abut directly against the inclined thrust plate without the use of articulated connecting rods so that the driving torque is transmitted through the pistons acting as centilevers by reason of that component of piston thrust against the inclined thrust plate which is normal to the shaft axis.

In such devices, the normal thrust component, or side thrust on the piston, not only creates the driving torque but also results in a substantial lateral force on the cylinder barrel tending to displace it from its normal position. In counteracting this lateral force it is important that the cylinder barrel be maintained flatly against the valve plate or it will frequently lift off completely due to fluid flow conditions set up when it starts to lift slightly. This of course renders the whole device inoperative and may be very hazardous where the device is connected to operate certain types of loads. The axial location of the point of application of the cylinder barrel supporting force may be so selected as to minimize tilting forces on the barrel as later described.

In prior art devices of this class, support for the cylinder barrel against lateral displacement has been provided by two general schemes. The first of these provides a radial bearing encircling the cylinder barrel directly interposed between the cylinder barrel and the housing. The second scheme has been to support the cylinder barrel directly on the shaft at the driving connection therewith and transmit the lateral thrust thereon to the housing through the shaft and shaft support. The advantage of the first scheme lies in the fact that the cylinder barrel support bearing may be axially positioned so to eliminate tilting moments on the barrel produced by the side thrust applied to the cantilever pistons. Disadvanatges of the first scheme are that a large bearing encircling the cylinder barrel increases the size and weight of the unit, and of course requirement of an extra bearing increases cost. Advantages of the second scheme include the fact that the shaft bearings serve a double purpose in supporting the shaft and the cylinder barrel, thus reducing size, weight, and cost of the unit. Disadvantages of the second scheme are that the heavy radial loads on the shaft of high pressure units have in the past required that the shaft bearings straddle the point of cylinder barrel support to provide adequate support for the shaft. Such an arrangement results in increased machining costs and is unsatisfactory for other reasons.

It is an object of the present invention to provide a construction which has the advantages of both the schemes heretofore mentioned but is free from their disadvantages.

More specifically, it is an object of the present invention to provide a device of the class described wherein the cylinder barrel is drive shaft supported but the moment on the shaft caused by the cylinder barrel is so reduced as to eliminate the necessity for shaft supports straddling the point of cylinder barrel support.

Another object is to provide such a device which is rugged, compact, and economical to manufacture.

Further objects and advantages of the present invention will be apparent from the following description, reference being had to the accompanying drawing wherein a preferred form of the present invention is clearly shown.

In the drawing the single figure is a longitudinal transverse section of a fluid pressure energy translating device incorporating a preferred form of the present invention.

The embodiment of the invention selected for illustration comprises a pump 10 of the cantilever piston type. The housing 12 of pump 10 comprises two parts 14 and 16 secured together by bolts 18. An O ring seal 20 insures a fluid tight juncture of the two parts and the dowel pin 22 maintains proper angular alignment between them. Body 12 includes a pilot portion 24 and a mounting flange 26 having mounting holes 28 therein.

A bore 30 in housing 12 provides a chamber 32 having a cylinder barrel 34 positioned therein. Cylinder barrel 34 is provided with a plurality of bores 36 each having a piston 38 axially slidable therein and a cylinder port 37. Pistons 38 have spherical ends 40 on which are swaged the socketed shoes 42. The cylinder barrel 34 is positioned axially between a valve plate 44 and an inclined thrust plate 46. Valve plate 44 may be the type described in the patent to Harry F. Vickers et al., 2,313,407, and serves in a well known manner to provide properly phased fluid connection between ports 37 of bores 36 and the external inlet and outlet connection ports of the device, one of which is indicated at 48. Thrust plate 46 is secured to the housing 12 by a number of screws 50 sealed against leakage from chamber 32 by O rings 52.

Shoes 42 have outwardly extending flanges 54 which are contacted by an annular cage 56 provided with holes 58 corresponding to each piston 38. A sleeve 60 is provided with a shoulder 62 to contact cage 56 and has a truncated conical bore 64 therein. Conical bore 64 contacts the spherical outer surface 66 of a collar 68 which is provided with a female spline to engage a male spline in the cylinder barrel at 70. A plurality of springs 72 in recesses 74 in cylinder barrel 34 act through collar 68, slevee 60, and cage 56 to bias the shoes 42 into engagement with the face 47 of thrust plate 46. The reaction force of springs 72 biases face 35 of the cylinder barrel 34 into engagement with face 45 of valve plate 44.

A drive shaft 76 is effective to transmit torque from a prime mover, not shown, to the cylinder barrel through a driving connection at 78. Further, it can be seen that the only radial support for cylinder barrel 34 is provided by the contact between the barrel and the shaft 76 at connection 78. Connection 78 is illustrated as a spline connection and preferably is of the universal type, that is, it prevents relative radial movement at the point of connection between shaft 76 and barrel 34 but permits axial movement of the barrel and existence of angularity between the shaft and cylinder barrel axes. Thus juncture of the faces 35 and 45 locates cylinder barrel 34 as to axial position and determines the angular position of its axis, and connection 78 locates the barrel radially.

Neglecting friction, torque applied to cylinder barrel 34 by drive shaft 76 is resisted by a force exerted on shoes 42 and hence pistons 38 by thrust plate 46. The force on each piston acts in a direction normal to face 47 of thrust plate 46 and has an effective point of application at the center of the spherical ends 40 of the pistons 30. This force on each piston can be resolved into an axial force and a radial force acting at the center of the spherical piston end. The summation of the radial forces is the radial force which must be supported by shaft 76 at the connection 78.

It is well known in the art that tipping forces on the cylinder barrel of such a unit can be kept to a minimum by providing its radial support as close as possible to a radial plane through the point of intersection of the drive shaft axis and the plane which includes the centers of the spherical ends of the pistons. The plane containing the centers of the piston ends is indicated at 80 and the point of intersection with the shaft axis at 82. It can be seen that connection 78 is axially centered about the intersection 82 thus minimizing tipping forces on the barrel 34.

One of the undesirable consequences of thus positioning connection 78 is that, prior to the present invention, the heavy radial loads exerted on the drive shaft at connection 78 created very large bending moments on the shaft if it was cantilever supported by bearings all on the same side of the connection. For high pressure units it became necessary to provide shaft support on each side of the shaft and cylinder barrel connection resulting in more expensive construction and presenting particular difficulty if the unit was to be a variable delivery one.

The present invention provides a cylindrical support sleeve 84, on the portion 14 of housing 12, which protrudes from the face 86 against which face the valve plate 44 rests. Sleeve 84 has a bearing bore 88 at its outward end and carries a shaft support bearing 90 therein. A second shaft support bearing 92 and a shaft seal 94 are provided in the shaft bore 96. Valve plate 44 and cylinder barrel 34 are provided with clearance bores 98 and 100, respectively, through which sleeve 84 passes. Bearing 90 is thus positioned in axial proximity to the connection 78 and the bending moment created by the radial load of barrel 34 on shaft 76 is minimized.

It will thus be seen that the present invention provides support on the drive shaft for the cylinder barrel to resist lateral movement and that support is properly positioned to minimize tilting of the barrel. Further, the invention provides for supporting the drive shaft in such a manner as to minimize bending moments produced thereon by lateral thrust of the cylinder barrel. This of course results in lowered stresses and deflections in the drive shaft making feasible the rugged economical construction illustrated.

While the form of embodiment of the invention as herein disclosed constitutes a preferred form, it is to be understood that other forms might be adopted, all coming within the scope of the claim which follows.

What is claimed is as follows:

A fluid pressure energy translating device comprising: a drive shaft; a housing having a stationary valve plate; a rotatable cylinder barrel in abutment with the valve plate and in driving relation with the drive shaft and having a plurality of axial cylinder bores; pistons reciprocable in the bores, each having a cantilever portion extending from the bores and having a spherical surface at one end of each piston; an inclined thrust plate mounted in the housing in driving relation with the pistons at their spherical ends; inlet and outlet ports alternately connectable through the valve plate to said cylinder bores by rotation of the cylinder barrel; means on the shaft for locating the barrel as to lateral position, and forming the sole lateral support therefor, said means including in its axial extent the point on the shaft axis which intersects the plane containing the centers of said spherical surfaces; means in said housing for rotatably supporting the drive shaft, said means including a support sleeve in the housing encircling the drive shaft and extending axially along the drive shaft from the juncture between the valve plate and the cylinder barrel toward said means on the shaft, and bearing means carried by said sleeve to contact said shaft; and a cantilever projection of said shaft extending beyond said bearing means and including said means on the shaft.

References Cited in the file of this patent

UNITED STATES PATENTS

| | | |
|---|---|---|
| 1,263,180 | Williams | Apr. 16, 1918 |
| 1,822,064 | Sorensen | Sept. 8, 1931 |
| 2,480,069 | Wright | Aug. 23, 1949 |
| 2,546,583 | Born | Mar. 27, 1951 |
| 2,642,810 | Robinson | June 23, 1953 |

FOREIGN PATENTS

| | | |
|---|---|---|
| 500,299 | Great Britain | Feb. 7, 1939 |
| 937,497 | France | 1948 |